D. CARROLL,

Assignor to J. UTTER.

Stump-Extractor.

No. 8,578. Reissued Feb. 11, 1879.

Witnesses:
Henry C. Gill
Frank C. Gill

Inventor:
David Carroll
By J. W. Ford Atty.

N. PETERS, PHOTO-LITHOGRAPHER, WASHINGTON, D. C.

UNITED STATES PATENT OFFICE.

DAVID CARROLL, OF SPRING CREEK, PENNSYLVANIA, ASSIGNOR TO JOHN UTTER, OF DELAVAN, WISCONSIN.

IMPROVEMENT IN STUMP-EXTRACTORS.

Specification forming part of Letters Patent No. 64,628, dated May 14, 1867; Reissue No. 8,578, dated February 11, 1879; application filed December 23, 1878.

*To all whom it may concern:*

Be it known that I, DAVID CARROLL, of Spring Creek, (formerly of Union,) in the county of Warren and State of Pennsylvania, have invented a new and useful Improvement in Stump-Extractors, which improvement is fully set forth in the following specification and accompanying drawings, in which—

Figure 1:
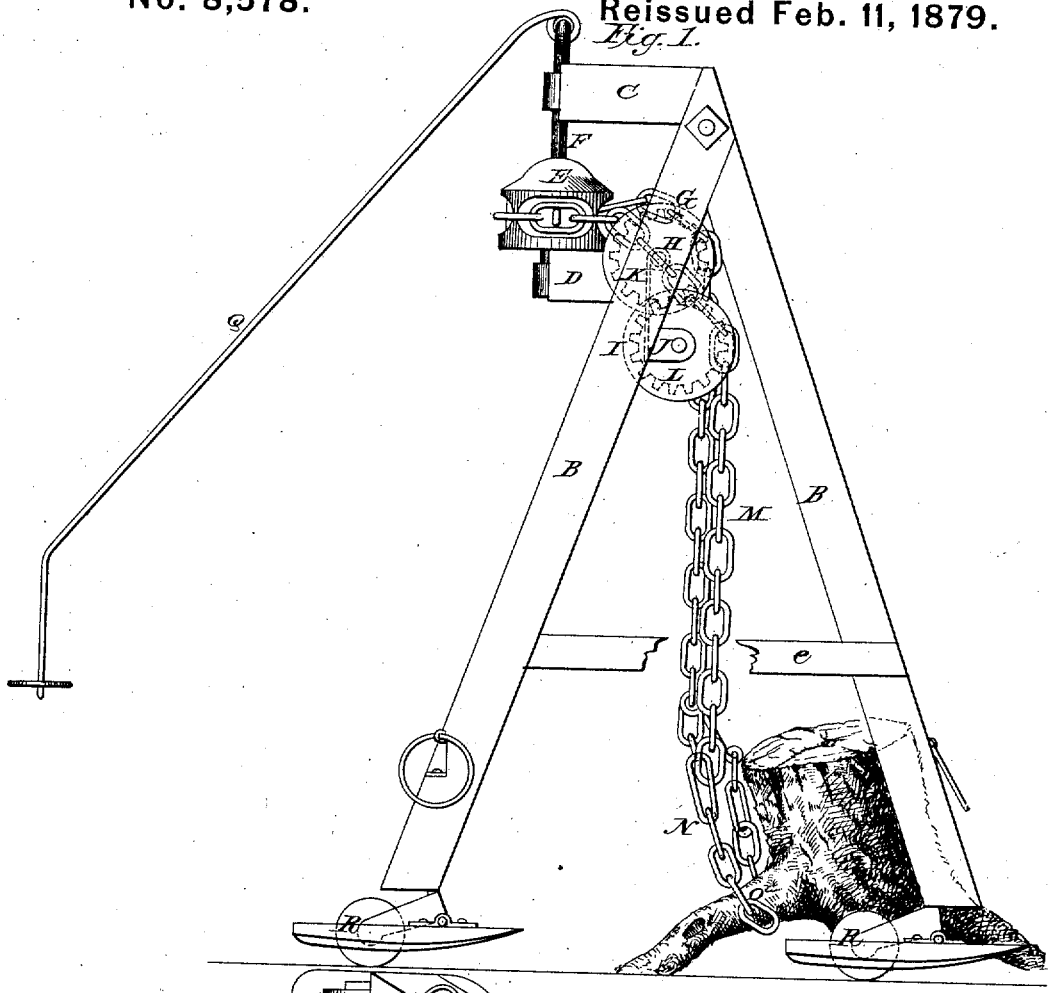
Figure 2:
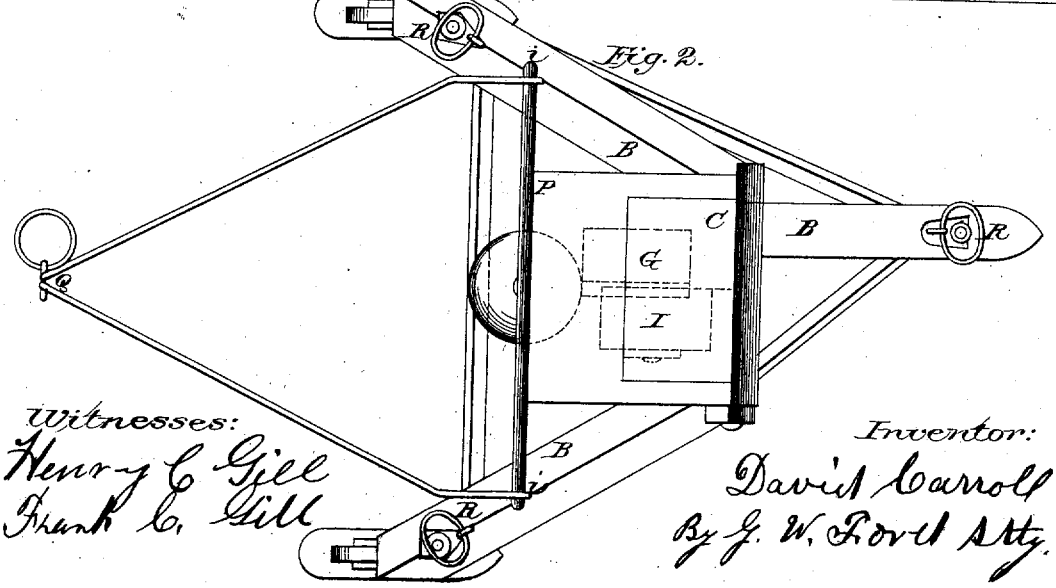

Figure 1 is a side view of my improved stump-extractor. Fig. 2 is a top view.

The object of the invention is to provide a stump-extractor that shall be simple in its construction and of sufficient power to expeditiously remove or elevate stumps, stones, or other heavy bodies upon which the machine is adapted to operate.

The invention consists of a supporting-frame mounted upon rollers or runners, or both, so as to be easily transported from field to field, or from stump to stump, and having as a motor, through which the power is applied, a sweep or lever connected with a driving-shaft, upon which is mounted a chain-pulley, into the periphery of which fit links of a cable or other suitable chain, which is, through the medium of a hitch-chain, made fast to the stump or other body that is to be removed. It also has other chain-pulleys, which serve as tension-pulleys to keep that portion of the chain that lies between the main or draft-chain pulley and the said tension-pulley in a strained position, so that it will not become knotted or tangled. The tension-pulleys also serve as guide-pulleys for guiding the chain onto and off from the said main chain or driving pulley, they being mounted upon shafts turning in suitable bearings, so as to revolve with the chain when the same is brought into moving contact with them.

The cable or main chain is preferably made endless, so as to pass in a continuous manner around the main chain-pulley, and in peripheral contact with the tension or guide pulleys. These pulleys are made to revolve by the use of a sweep or lever, forked or single, as may be desired, to the free end of which the power is applied.

Two guide or tension pulleys (one with either portion of the chain) must be used.

The main draft or cable chain is provided with a side or stump hitch chain, and is secured by one of its ends to the main or cable chain. The other end is fastened to the stump that is to be pulled. B are timbers forming part of the wheel-supporting frame, fastened together in any suitable manner, and to which are secured the upper platform, C, and the lower platform, D, between which the chain-pulley E is placed. This chain-pul- E is mounted upon a shaft, F, which revolves in suitable bearings secured to the platform or upper and lower decks, C D. This chain-pulley E is constructed in such a manner that the links of the chain fit into the indentations made for that purpose in the periphery, and by means of which the pull is had upon the stump through the medium of the cable-chain when the pulley is made to revolve.

G is a pulley constructed in the same manner as the pulley E—that is, with indentations in the periphery, into which the said links fit, so that the relative position of the chain and the pulleys will always be the same, and as here shown is mounted upon a horizontal shaft, designated H.

I is still another pulley, being counterpart of pulleys H and G. This pulley I is mounted upon a short shaft that has bearings and runs in a bifurcated bar or strap, J, the shank end of which is pivoted around the shaft H, so that the pulley I, if desired, can be brought upon the same horizontal plane with the pulley H, or it may be raised above the same or lowered below the said pulley, as it will move in the arc of a circle described by the shank or strap J upon the shaft H.

At the side of the pulley G is secured a gear-wheel K, that meshes and works in a corresponding gear-wheel, L, that is secured to the side of the pulley I. The object of having the pulleys G and I made with indentations in the periphery for the reception of the chain is that they may act as tension-pulleys, and keep that portion of the chain that runs between the said pulleys and the main pulley E in a taut position, and prevent the chain from becoming tangled or knotted, and thus cause friction or the breaking of the working parts.

K is a gear-wheel secured to the pulley G, so as to mesh into a corresponding gear-wheel that is secured to the side of the pulley I, and in such manner that the relative positions of the pulleys and main draft-chain will at all times be the same.

M is a cable or draft chain, preferably made endless, the links of which fit into the indentations in the periphery of the pulley E, and gives a direct pull upon the stump through the medium of the guide-pulleys I and G, and is of sufficient length to reach, in connection with the hitch-chain N, the stump that is to be pulled. The chain M is propelled by the revolution of the pulley E and by the power applied to the sweep, and I prefer having the said chain made endless, for the reason that it is always in position for engaging the chain designated N, and it can be moved in either direction and in a continuous manner.

P is a cross-bar, located and secured across the top of the vertical shaft F, by means of which greater leverage is obtained, and consequently more power is had when the bifurcated lever Q is attached to the ends of the cross-bar, as shown at *i i*, Fig. 2.

*e* are connecting-bars, which securely unite and brace the lower portion of the supporting-frame B.

R are shoes or runners, in which are caster-wheels for the convenience of moving the machine from one place to another. These shoes or runners are made with a bearing-surface of sufficient capacity to prevent the frame from sinking into the ground when a pull is being had.

It will be observed that by having the machine mounted upon caster-wheels it can, from its anchoring-point, be readily swung around in any direction, so as to pull all of the stumps within the reach of the cable-chain and in the radius of the circle of which the anchor is the center, all of which will be readily understood without further description.

Having now fully described my invention, what I claim as new, and desire to secure by Letters Patent, is—

1. In a stump-extractor, the combination of a chain-pulley having indentation in its periphery, a chain with links adapted to fit into the said indentations, so as to operate by having a single coil of chain about the pulley, the supporting-frame upon which the chain-pulley is mounted, and operated by a sweep or lever to which the power is applied, substantially as described and specified.

2. In a stump-extractor, the combination of a chain-pulley attached to a sweep for communicating power, a chain adapted to fit into the indentations in the chain-pulley and tension or chain-guiding pulley, all mounted upon a supporting-frame, and operating substantially as herein described.

3. The combination of the driving chain-pulley, the stationary guide-pulley, the adjustable guide-pulley, as shown, the gear-wheels upon the guide-pulleys connecting the same together, all mounted upon the supporting-frame, substantially as described.

4. The combination of the driving chain-pulley, the tension or chain-guiding pulleys, the supporting-frame, and the endless, draft, and stump hitch chains, all arranged and operating substantially as described.

5. The combination of the driving chain-pulley, mounted upon a bearing-shaft having the T-shaped cross-shaft, the bifurcated sweep or operating lever, and the supporting-frame, arranged and operating substantially as described.

6. In a stump-extractor having a draft-wheel and draft-chain, the combination of the supporting-frame, the shoes or runners under the said frame, and the caster-wheels for moving purposes, arranged substantially as described.

This specification signed and witnessed this 20th day of November, 1878.

DAVID CARROLL.

Witnesses:
ETTA BATES,
J. W. MALLERY.